Patented July 7, 1936

2,047,143

UNITED STATES PATENT OFFICE 2,047,143

CASEIN SOLUTIONS

Carl Iddings, Staten Island, N. Y., assignor to The Muralo Company, Inc., a corporation of New York No Drawing. Application December 8, 1933,
Serial No. 701,571

25 Claims. (Cl. 134—20)

The present invention relates to a stable casein solution and a process of making the same. The casein solution produced is characterized by its stability over long periods of time; its viscosity does not decrease on standing and moreover it does not readily putrefy.

An object of my invention is the production of a casein solution which is useful in various industrial processes and for various purposes. It is especially adapted for the manufacture of water paste paints, water-oil emulsions, glues, sizes, for the preparation of various coating compositions intended to be applied to walls, floors, leather, paper, etc., and it may serve as a basis for printing inks.

Another object of my invention is to prepare a casein solution of relatively heavy or viscous body and yet not containing large quantities of dissolved and/or peptized casein. Thus moderately dilute casein solutions are produced which, while flowing very slowly, permit application by means of brushing, spraying or in any other manner known to those skilled in the art.

A third object of my present invention is the production of a casein solution which may be mixed and thinned down with water and, which, when used for the preparation of water paste paints, results in compositions which may be readily thinned with water and applied.

A fourth object of my invention is the manufacture of such a casein solution which when brushed upon a smooth surface, produces a smooth, tenacious film on drying which is uniform in thickness, fairly transparent and possesses excellent adhesive properties.

Although any type of dissolved and/or peptized casein may be used in my process, I prefer to use casein solutions prepared in accordance with my copending applications Ser. No. 701,570, filed December 8, 1933, Ser. No. 701,572, filed December 8, 1933, (Patent No. 2,023,389), and Ser. No. 701,573, filed December 8, 1933. To prepare my final casein composition, I proceed preferably in the following manner: A glycerol-phthalate resin, which may or may not contain enclosed drying oils, is dissolved in a suitable amount of dilute "liquor ammonii", preferably in the presence of a small amount of ethylene glycol monoethyl ether to clarify the solution. The glycerol-phthalate resin used should preferably be a resin the condensation of which has been carried to a viscous or solid state of polymerization, although retaining its property of being soluble in dilute alkali solutions. Such a resin is sold under the trade name "Ellisol B", although it is to be noted that any other type conforming to the aforementioned conditions may be used in my process. This ammonia-resin solution (ammonium-resin soap) is added to the casein solution and thoroughly mixed with the same. The mixing of the two solutions is preferably carried out at somewhat elevated temperatures, since the solutions thin down sufficiently in a warm state to allow ready mixing and stirring. I have found by experimentation that temperatures varying from 120–170° F. are especially suitable for carrying out this mixing procedure. The thoroughly mixed solution is allowed to cool to room temperature, and it will be found that the initial casein solution has become much more viscous by the addition of the glycerol-phthalate solution. The final viscosity of my casein composition depends upon the proportions of casein and resin used. It may flow easily or be very stiff and viscous and yet it will remain smooth in appearance, retentive of its useful adhesive qualities and stable with respect to viscosity over long periods of time.

Example 15 parts of glycerol-phthalate resin are dissolved in a mixture of 25 parts of water, 2 parts of ethylene glycol monoethyl ether and 3.5 parts of concentrated ammonium hydroxide solution. The dissolution of the solid phase is preferably brought about by heating the mixture to about 120–170° F. The resulting resin solution will be reasonably clear provided an alkali soluble glycerol-phthalate resin was used. This alkaline resin solution is subsequently stirred into 500 parts of a casein solution, preferably prepared in accordance with my copending applications above referred to, at a temperature of about 150° F. until the composition becomes smooth. This casein solution might, for example, contain 10% casein by weight. Upon cooling this solution will be extremely viscous and strongly gelled but will nevertheless flow slowly. The final preparation may be diluted or thinned down to any degree desired and will have excellent keeping qualities, and it will be very resistant to attack by microorganisms. Instead of dissolving the resin in ammonia to produce an ammonium resin soap the same may be dissolved in other alkalis, such as borax, sodium hydroxide, potassium hydroxide, etc., to produce resin soaps suitable for incorporation into casein solutions. Other auxiliary viscosity modifying agents, such as urea, sodium fluoride, etc., as well as suitable thinners as disclosed in my copending application Serial Number 701,570, filed December 8, 1933, may be added to the casein solution to modify its properties. The thinners contemplated in the copending application Serial Number 701,570 include water soluble and partly water soluble alcohols, esters, ethers and ketones, of which the following are examples: acetone, butanol, diethylene glycol monoethyl ether, diethylene glycol mono-butyl ether, dioxan, ethyl acetate, ethyl lactate, ethylene glycol mono-ethyl ether, ethylene glycol mono-butyl ether, ethylene glycol mono-ethyl ether acetate, isopropanol, and cyclohexanol. The proportions of casein and resin soap may be varied within wide limits and the amounts of ammonia or other alkalis may be changed to produce a slightly acidic or slightly alkaline casein solution without affecting its stability or keeping qualities. Preserving agents, such as sodium orthophenyl phenate, etc., may be added at will, although I have found that casein dispersed with fluorides, e. g. sodium fluoride, ordinarily requires no further preserving agent to prevent attack by microorganisms. It is also to be noted that it is not necessary to prepare the casein and resin solutions separately, although this is more convenient in practice. Satisfactory solutions may be prepared by dissolving the resin directly in the casein solution which preferably has been previously rendered slightly alkaline. The amounts of alkali and resin employed to produce a water-soluble soap may be adjusted so that the final solution is either slightly acidic or alkaline. It is to be noted that ammonia, methyl amine, that is volatile alkalis, are preferable in my process because of the after evaporation which is effected thereby. Although an addition of ethylene glycol mono-ethyl ether produces somewhat smoother and better flowing casein-resin solutions, it may be dispensed with since its omission from the composition does not impair the resultant adhesive and other useful qualities, or in other words, while this addition is useful it is not essential.

While I have found that the ingredients and proportions above mentioned give the desired results, I do not wish to be limited to the use of all of these ingredients, to these ingredients and no others, nor to the exact proportions, degrees of temperature and concentrations set forth above, as the omission of some ingredients or a slight variation of the proportions, cited above, will not adversely affect the final products, although it may vary somewhat the relative characteristics of such products resulting from such variations. Modifications of my invention will manifest themselves to those skilled in the art, and I wish to include such of these coming within the scope of the appended claims.

I claim:

1. The process of producing a modified stable aqueous casein solution characterized by its stability and undiminished viscosity over long periods of time comprising adding to a stable casein solution a water-soluble soap of a glycerol-phthalate resin in amounts of less than 50% based upon the weight of casein.

2. The process of producing a modified stable aqueous casein solution characterized by its stability and undiminished viscosity over long periods of time comprising adding to a stable casein solution an ammonium soap of a glycerol-phthalate resin in amounts of less than 50% based upon the weight of casein.

3. The process of producing a modified stable aqueous casein solution characterized by its stability and undiminished viscosity over long periods of time comprising adding to a stable casein solution a water-soluble soap of a glycerol-phthalate resin, in amounts of less than 50% based upon the weight of casein, and urea.

4. The process of producing a modified stable aqueous casein solution characterized by its stability and undiminished viscosity over long periods of time comprising adding to a stable casein solution an ammonium soap of a glycerol-phthalate resin, in amounts of less than 50% based upon the weight of casein, and urea.

5. The process of producing a modified stable aqueous casein solution characterized by its stability and undiminished viscosity over long periods of time comprising adding to a stable casein solution a water-soluble soap of a glycerol-phthalate resin, in amounts of less than 50% based upon the weight of casein, and a water-soluble fluoride.

6. The process of producing a modified stable aqueous casein solution characterized by its stability and undiminished viscosity over long periods of time comprising adding to a stable casein solution an ammonium soap of a glycerol-phthalate resin, in amounts of less than 50% based upon the weight of casein, and a water-soluble fluoride.

7. The process of producing a modified stable aqueous casein solution characterized by its stability and undiminished viscosity over long periods of time comprising adding to about 500 parts of an approximately 10% casein solution a resin soap consisting of about 15 parts of a glycerol-phthalate resin dissolved in about 3.5 parts of concentrated ammonium hydroxide and about 2 parts of ethylene glycol mono-ethyl ether.

8. The process of producing a modified stable aqueous casein solution characterized by its stability and undiminished viscosity over long periods of time comprising adding to a stable casein solution a water-soluble soap of a glycerol-phthalate resin in amounts of less than 50% based upon the weight of casein, said resin soap containing an ethylene glycol mono-ethyl ether.

9. The process of producing a modified stable aqueous casein solution characterized by its stability and undiminished viscosity over long periods of time comprising adding to a stable casein solution an ammonium soap of a glycerol-phthalate resin in amounts of less than 50% based upon the weight of casein, said ammonium soap containing an ethylene glycol mono-ethyl ether.

10. The method of controlling the viscosity of an aqueous casein solution characterized by its stability and undiminished viscosity over long periods of time comprising adding thereto a water-soluble soap of a glycerol-phthalate resin in amounts of less than 50% based upon the weight of casein.

11. The method of controlling the viscosity of an aqueous casein solution characterized by its stability and undiminished viscosity over long periods of time comprising adding thereto an ammonium soap of a glycerol-phthalate resin in amounts of less than 50% based upon the weight of casein.

12. A casein solution characterized by its stability and undiminished viscosity over long periods of time comprising an aqueous solution of casein and a water-soluble soap of a glycerol-phthalate resin in amounts of less than 50% based upon the weight of casein.

13. A casein solution characterized by its stability and undiminished viscosity over long periods of time comprising an aqueous casein solution and an ammonium soap of a glycerol-phthalate resin in amounts of less than 50% based upon the weight of casein.

14. The process of producing a modified stable aqueous casein solution comprising adding to a casein solution characterized by its stability and undiminished viscosity over long periods of time a water-soluble soap in amounts of less than 50% based upon the weight of casein, said soap being produced by reacting a volatile alkali upon a glycerol-phthalate resin.

15. The process of producing a modified stable aqueous casein solution characterized by its stability and undiminished viscosity over long periods of time comprising adding at an elevated temperature to a stable casein solution, a water-soluble soap of a glycerol-phthalate resin in an amount approximating 30% based upon the weight of casein.

16. The method of controlling the viscosity of an aqueous casein solution characterized by its stability and undiminished viscosity over long periods of time comprising adding at an elevated temperature thereto a water-soluble soap of a glycerol-phthalate resin in an amount approximating 30% based upon the weight of casein.

17. A casein solution characterized by its stability and undiminished viscosity over long periods of time comprising an aqueous solution of casein and a water-soluble soap of a glycerol-phthalate resin in an amount approximating 30% based upon the weight of casein.

18. The process of producing a modified stable aqueous casein solution characterized by its stability and undiminished viscosity over long periods of time comprising adding to a stable casein solution a water soluble soap of a glycerol-phthalate resin in amounts of less than 50% based upon the weight of casein, and an auxiliary viscosity modifying agent compatible with stability.

19. A casein solution characterized by its stability and undiminished viscosity over long periods of time comprising an aqueous solution of casein and a water soluble soap of a glycerol-phthalate resin in amounts of less than 50% based upon the weight of casein, and an auxiliary viscosity modifying agent compatible with stability.

20. The process of producing a modified stable aqueous casein solution characterized by its stability and undiminished viscosity over long periods of time comprising adding to a stable casein solution a water soluble soap of a glycerol-phthalate resin in amounts of less than 50% based upon the weight of casein, and an auxiliary organic viscosity modifying agent compatible with stability.

21. A casein solution characterized by its stability and undiminished viscosity over long periods of time comprising an aqueous solution of casein and a water soluble soap of a glycerol-phthalate resin in amounts of less than 50% based upon the weight of casein, and an auxiliary organic viscosity modifying agent compatible with stability.

22. The process of producing a modified stable aqueous casein solution characterized by its stability and undiminished viscosity over long periods of time comprising adding to a stable casein solution a water soluble soap of a glycerol-phthalate resin in amounts of less than 50% based upon the weight of casein, and an auxiliary inorganic viscosity modifying agent compatible with stability.

23. A casein solution characterized by its stability and undiminished viscosity over long periods of time comprising an aqueous solution of casein and a water soluble soap of a glycerol-phthalate resin in amounts of less than 50% based upon the weight of casein, and an auxiliary inorganic viscosity modifying agent compatible with stability.

24. The process of producing a modified stable aqueous casein solution characterized by its stability and undiminished viscosity over long periods of time comprising adding to a stable casein solution a water soluble soap of a glycerol-phthalate resin in amounts of less than 50% based upon the weight of casein, and an auxiliary water soluble or partly water soluble viscosity modifying agent compatible with stability selected from the group consisting of the lower aliphatic alcohols, esters, ethers and ketones.

25. A casein solution characterized by its stability and undiminished viscosity over long periods of time comprising an aqueous solution of casein and a water soluble soap of a glycerol-phthalate resin in amounts of less than 50% based upon the weight of casein, and an auxiliary water soluble or partly water soluble viscosity modifying agent compatible with stability selected from the group consisting of the lower aliphatic alcohols, esters, ethers and ketones.

CARL IDDINGS.